July 27, 1971            J. R. SCHEDER            3,595,766

PREVENTION OF PROTEIN PRECIPITATION IN THE
ELECTRODIALYTIC TREATMENT OF WHEY

Filed Feb. 27, 1969

INVENTOR.
John R. Scheder
BY
Howard G. Russell
his ATTORNEY

United States Patent Office 3,595,766
Patented July 27, 1971

3,595,766
PREVENTION OF PROTEIN PRECIPITATION IN THE ELECTRODIALYTIC TREATMENT OF WHEY
John R. Scheder, Horicon, Wis., assignor to Purity Electrochemical Company, Mayville, Wis.
Filed Feb. 27, 1969, Ser. No. 802,766
Int. Cl. B01d 13/02
U.S. Cl. 204—180P      5 Claims

ABSTRACT OF THE DISCLOSURE

Whey is demineralized in a multichamber electrodialysis cell comprising deionization chambers and concentrating chambers formed between alternating cation membranes of ion exchange material and neutral membranes. Protein precipitation is reduced, or prevented, by preventing substantial changes in the pH of at least the anolyte by the use of a buffer electrolyte, thus reducing the generation of hydrogen ions which appear to cause such precipitation.

---

Figure 1:
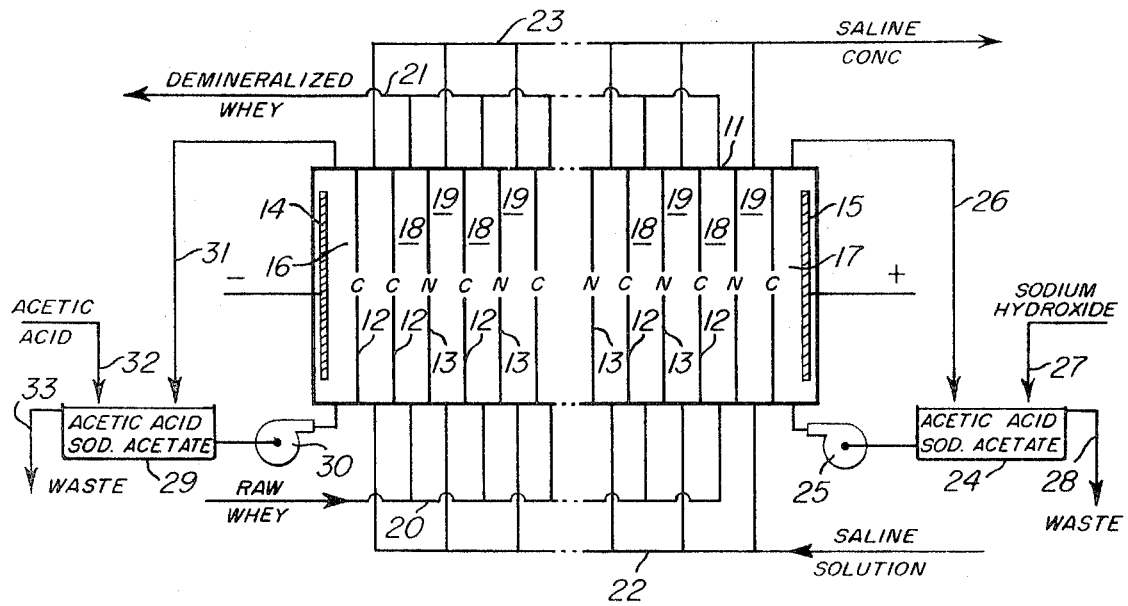

This invention provides improvements in the method or process of demineralization of whey by electrodialysis.

It has been proposed to extract ash and lactic acid from whey by passing the whey solution through the deionization chambers of an electrodialysis cell comprising alternating deionization chambers and concentrating chambers arranged between a pair of electrodes and separated from one another by alternatingly arranged permselective anion membranes and cation membranes of ion exchange material, sulfuric acid serving an electrolyte. More precisely defined, the membranes are microporous and comprise fixed electric charges by reason of which the pores of the anion membrane become anion-permeable and cation-passage-resistant and the cation membrane pores become cation-permeable and anion-passage-resistant.

In testing such cells, it was observed that the membranes exhibit undesirable characteristics which are incompatible with commercial operation.

Firstly, it was observed that the anion membranes have a tendency of rapid clogging, as a result of which the cell output is progressively diminished.

Without desiring to ascribe a definite cause to such clogging, it seems reasonable to assume that the fixed positive charges in the anion membrane material contribute to the clogging in view of the further fact that protein molecules have a slight negative charge.

Further, I observed that the anion membranes tend to polarize at lower current densities than cation membranes, thereby reducing the current passing through the cell and consequently limiting the cell output.

For the foregoing reasons, I concluded that anion membranes should be eliminated altogether and replaced by neutral membranes having substantially no fixed charges.

Electrodialysis cells comprising membranes of two kinds, one kind being permselective ion exchange membranes, and the other kind being neutral membranes, are known from Kollsman Pat. 2,872,407 which discloses that in a cation membrane/neutral membrane system anions pass through the neutral membrane in preference to cations, as if the neutral membrane were actually cation passage resistant, the limitation on the passage of cations being the result of the property of the ionic liquid to remain ionically balanced.

The present invention is further based on the recognition that a cell in which permselective membranes of one polarity are replaced by neutral membranes is by no means an equivalent of the conventional cell comprising cation selective and anion selective membranes in alternating sequence. These two kinds of cells do not operate with substantially the same means nor do they perform or operate in substantially the same manner. The significance of this recognition in relation to the treatment of whey will become presently apparent.

In the operation of whey demineralizing electrodialysis cells with cation membranes and neutral membranes it is observed that protein molecules tend to precipitate.

According to my observations, the protein precipitation is related to the presence of hydrogen ions. Hydrogen ions originate in the anode chamber and are capable of passing through all the chambers of a cell comprising cation membranes and neutral membranes. Hydrogen ions are therefore able to promote protein precipitation.

Attempts to limit the availability or generalization of hydrogen ions at the anode meet with difficulties. In typical instances in which an anolyte of a certain pH was fed into the anode chamber the pH—i.e., the presence of hydrogen—changed so rapidly during the anolyte passage through the chamber that the anolyte effluent differed by several pH units from the influent. For example, sodium sulfate anolyte influent of pH 7 would become an effluent of a pH between 1 and 2, thus rendering available substantial amounts of hydrogen ions for passage into whey compartments.

The undesirable effects are aggravated if whey happens to be present in the salt collecting compartments. In such cases precipitation of calcium was observed. The reasons for this are not yet fully understood, but it appears that the calcium precipitation resulting from whey leakage is also diminished in proportion to the scarcity of available hydrogen ions in the anode chamber.

I therefore propose to limit the availability of hydrogen ions in the anode chamber by the use of a buffer solution at least for the anode stream.

It has been proposed to supply the electrode compartments of an electrodialysis cell comprising permselective anion membranes and cation membranes with a recirculated stream of a buffered acid from a reservoir. In that particular case, however, increased availability of hydrogen ions presented no precipitation problem, nor was the prevention of precipitation indicated or suggested, nor was it physically possible for hydrogen ions to pass through all the chambers of the cell, as every second membrane was an anion-permeable, hydrogen-passage-resistant membrane of ion exchange material.

The method of demineralizing a solution stream containing whey protein and comprising flowing said stream through certain deionizing chambers of an electrodialysis apparatus in which deionizing chambers and concentrating chambers are arranged in alternating order, said chambers being defined, respectively, between a plurality of spaced alternatingly disposed hydraulically substantially impermeable membranes of two kinds, the one kind being selectively permeable to ions of one polarity and passage resistant to ions of the opposite polarity, the membranes of the other kind being permeable to ions of said opposite polarity; flowing an electrolyte solution as a concentrating stream through the concentrating chambers lying between said certain chambers; applying at electrodes a direct electric potential to pass an electric current in series across said membranes and the chambers defined between them, the polarity being such as to cause ions of said opposite polarity in said whey stream to migrate away from the respective membrane bordering the respective stream, which membrane is passage resistant to said opposite polarity ion, said electrodes being disposed in electrode chambers; and passing electrolyte through said electrode chambers is improved according to the present invention in that said membranes of the one kind are selectively cation permeable, that said membranes of the other kind are substantially neutral, thereby permitting cations to pass through a plurality of successive whey streams and concentrating streams, and in that at least the anode stream is a buffer solution.

In the event the same solution is to serve as anolyte and catholyte involving the combination of anolyte effluent and catholyte effluent, suitably gaseous hydrogen and oxygen are extracted from the respective effluents prior to such combination. Degassing devices for such gas removal are known per se.

A preferred pH range for the anolyte is between 4 and 5 in which case a production cell will operate without difficulties for 24 hours at current densities in excess of 20 amps. per square foot of membrane. Twenty-four hours is ample running time for the maintenance of a daily cycle which has proved practical and convenient for production purposes.

The various objects, features and advantages of this invention will appear more fully from the detailed description which follows accompanied by examples and drawings showing, for the purpose of illustration, representative cell arrangements. The invention also resides in certain new and original method steps, sequence of steps and combinations of devices therefor.

Although the characteristic features of the invention which are believed to be novel will be particularly pointed out in the claims appended hereto, the invention itself, its objects and advantages, and the manner in which it may be carried out, may be better understood by referring to the following description taken in connection with the accompanying drawings and examples forming a part of this disclosure.

Figure 2:
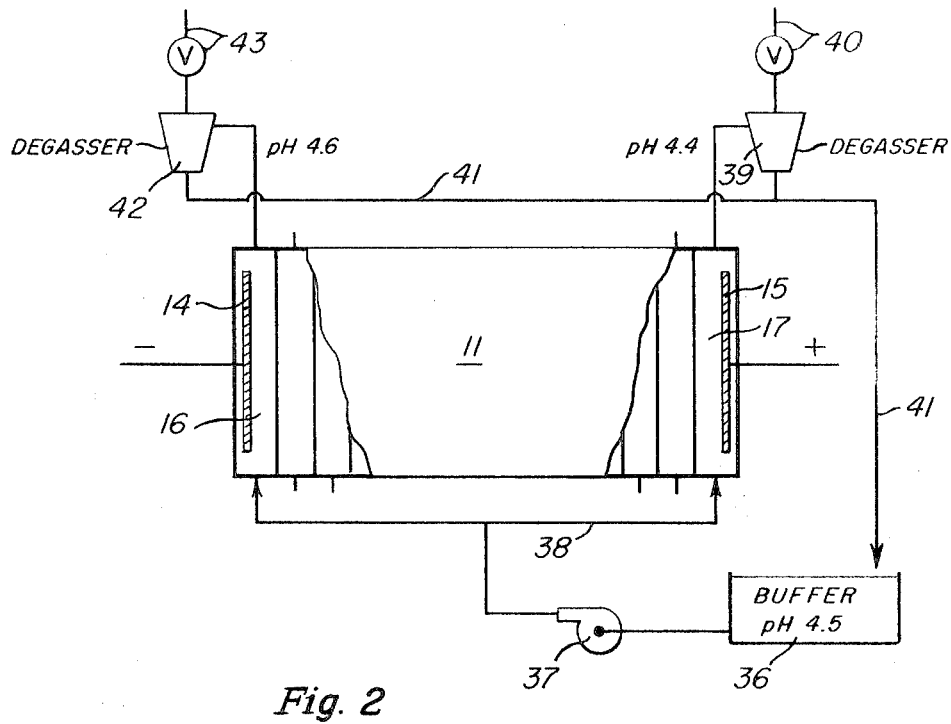

In the drawings:

FIG. 1 is a diagrammatic illustration of a representative whey demineralizing cell incorporating the present invention; and FIG. 2 is a diagrammatic illustration of the cell of FIG. 1 with a single recirculating system for anolyte and catholyte.

In the following description and in the claims various details will be identified by specific names for convenience. The names, however, are intended to be generic in their application. Corresponding reference characters refer to corresponding elements in the several figures of the drawings.

The drawings accompanying, and forming part of, this specification disclose certain details for the purpose of explanation of broader aspects of the invention, but it should be understood that certain structural details may be modified in various respects without departure from the principles of the invention and that the invention may be incorporated in, or practiced by, structurally different cell systems than shown.

The electrodialysis cell 11 comprises alternatingly arranged cation-permeable, anion-passage-resistant membranes 12 of ion exchange material, and neutral membranes 13, cellophane being a representative example of the latter. Electrodes 14 and 15 are mounted in electrode chambers 16 and 17, electrode 14 being connected to a source (not shown) of negative direct potential, which makes it a cathode, and electrode 15 being connected to a source of positive direct potential, which makes it an anode.

In the illustrated arrangement of membranes and electrodes every other chamber—excluding the electrode chambers—becomes a deionization chamber 18, and the chambers 19 therebetween become concentrating chambers.

Whey to be demineralized is conducted into the deionization chambers from a raw whey manifold duct 20 and demineralized whey is collected in, and withdrawn from, the cell 11 by a manifold duct 21. Saline solution enters the concentrating chambers 19 from a manifold 22 and leaves in a concentrated state through manifold 23.

Anolyte is supplied to the anode chamber 17 from a tank 24 containing a buffer solution, for example acetic acid/sodium acetate by means of a pump 25, and anode chamber effluent returns to the tank 24 through a return duct 26. Make-up liquid may be added to the tank contents 24 through a supply duct 27 in order to reestablish the original pH of the buffer, for example 4.5, particularly in the event the cubic content of the tank 24 is small and/or the operating period of the cell 11 is long. Excess liquid is drained through a duct 28.

At the cathode end a tank 29 contains buffer solution which is fed into the cathode chamber 16 by a pump 30. A return duct 31 returns cathode chamber effluent to the tank 29. A supply duct 32 supplies acetic acid to the tank 29 originally and for make-up purposes, and excess liquid may be drawn from the tank through a duct 33.

In the arrangement illustrated in FIG. 2 the pH of the buffer remains substantially unaltered without any addition of make-up liquid. A common tank 36 is provided for the buffer whence a pump 37 supplies the electrolyte to the electrode chambers 16 and 17 through a manifold duct 38.

The anolyte effluent has a pH slightly more acid than the influent and contains free oxygen gas which is eliminated by a cyclone type gas extractor 39 of conventional construction. The degasser discharges gas through a valved duct 40, and degassed electrolyte is discharged into a common discharge duct 41 leading to tank 36.

The catholyte effluent has a pH slightly more alkaline than the influent. Free hydrogen is eliminated by a degasser 42 having a valved gas discharge duct 43 and discharging degassed catholyte into the duct 41.

The whey treated contained 40 percent solids and 60 percent water. The solids comprised approximately 20 percent minerals, 22 percent protein, 45 percent lactose and a balance of carbohydrates, citrates and other constituents. Whey pH 7. The cell contained a total of 100 chambers.

EXAMPLE 1

Operation with sodium chloride anolyte.
Run (a) influent pH 7.0; effluent pH 2.1
Run (b) influent pH 6.0; effluent pH 2.1
Run (c) influent pH 5.2; effluent pH 1.0

Results

Run (a) Starting voltage: 200 v.; current: 90 amps. after 12 hours: 210 v.; 90 amps.
Examination of the disasembled cell showed slight precipitation of protein.

Run (b) Starting voltage: 200 v.; current: 90 amps. after 12 hours: 208 v.; 90 amps.
Examination of the disassembled cell showed slight precipitation of protein.

Run (c) Starting voltage: 205 v.; current: 90 amps. after 10 hours: 220 v.; 90 amps.
Examination of the disassembled cell showed heavier precipitation than in either run $a$ or $b$.

EXAMPLE 2

Operation of the same cell with buffer: 1 molar sodium acetate and 1 molar acetic acid. Electrode chamber effluents mixed according to FIG. 2, but separately tested as to pH.

Potential: 197 v. Current: 90 amps.
Tank contents (36) pH.: 4.75 at start
Anolyte effluent pH: 4.78
Catholyte effluent pH: 4.65
At the end of 12 hours tank contents pH: 4.80
Anolyte effluent: 4.91
Catholyte effluent: 4.75

Duration of test 12 hours. No make-up of the buffer electrolyte. At the end of test: potential 200 v. at 90 amps.

Examination of the disasembled cell showed no protein precipitation.

EXAMPLE 3

Catholyte: sodium chloride; Anolyte: sodium sulfate. Separate tanks for anolyte and catholyte. At start of run: 198 v.; 90 amps. At end of run: 214 v.; 90 amps.

Anolyte tank contents were held at a pH between 0.7 and 1.0 by adding excess acid in an amount sufficient to produce an effluent pH 0.7 from an influent pH of 1.0. After 11 hours the cell was disassembled and substantial amounts of protein were found precipitated in the first concentrating chamber and the adjacent whey deionization chamber.

EXAMPLE 4

Example 3 was repeated but a mechanical leak was simulated by feeding whey into the the concentrating stream influent in an amount to maintain the solids at about twice the normal level. In order to maintain the current substantially constant at 90 amps. the potential had to be increased from 197 v. to 225 v. shortly whereafter the cell failed. After disassembly it was found that calcium had precipitated on all cation selective membranes and that protein had precipitated in the salt collecting and whey streams nearest the anode compartment.

EXAMPLE 5

Separate tanks were used for anolyte and catholyte, the electrolytes being 1 molar sodium acetate and 1 molar acetic acid.

A whey leak was simulated by feeding whey into the salt collecting stream.

The cell clogged with calcium deposited on cation selective membranes on the salt collecting stream side. No protein precipitate was found in either the salt collecting stream or the whey demineralizing streams near the anode.

In other tests other buffer electrolytes were used with comparable results.

Secondary sodium citrate gives a pH of 5 although its buffer capacity is greater at lower pH.

Potassium acid phosphate and sodium hydroxide are capable of maintaining a pH of 6.8, but offered no noticeable advantage over sodium acetate/acetic acid.

The term "buffer" is meant to include weak acids, such as acetic acid, which have a certain buffer capacity of their own, as well as solutions of salts of a weak acid, such as sodium acetate. A mixture of weak acid and of a solution of a salt of a weak acid produces the most effective buffer.

What is claimed is:

1. Method of demineralizing a solution stream containing whey protein comprising flowing said stream through certain deionizing chambers of an electrodialysis apparatus in which deionizing chambers and concentrating chambers are arranged in alternating order, said chambers being defined, respectively, between a plurality of spaced alternatingly disposed hydraulically substantially impermeable membranes of two kinds, the one kind being selectively permeable to ions of one polarity and passage resistant to ions of the opposite polarity, the membranes of the other kind being permeable to ions of said opposite polarity; flowing an electrolyte solution as a concentrating stream through the concentrating chambers lying between said certain chambers; applying at electrodes a direct electric potential to pass an electric current in series across said membranes and the chambers defined between them, the polarity being such as to cause ions of said opposite polarity in said whey stream to migrate away from the respective membrane bordering the respective stream, which membrane is passage resistant to said opposite polarity ion, said electrodes being disposed in electrode chambers; and passing electrolyte through said electrode chambers, the method being characterized in that (1) said membranes of one kind are selectively cation permeable, that (2) said membranes of the other kind are substantially neutral, thereby permitting cations to pass through a plurality of successive whey streams and concentrating streams, and in that (3) at least the anode stream is a buffer solution.

2. The method according to claim 1 in which the anode stream is perdominantly a solution of a buffer salt.

3. The method according to claim 1 in which the same buffer solution serves as anolyte and as catholyte and in which anolyte effluent and catholyte effluent are combined, characterized that prior to said combination gaseous oxygen and hydrogen, respectively, are extracted from said effluents.

4. The method according to claim 1 in which a pH is maintained of the anolyte between 4 and 5.

5. The method according to claim 1 in which the anolyte buffer is sodium acetate/acetic acid.

References Cited

UNITED STATES PATENTS

| | | | |
|---|---|---|---|
| 1,022,523 | 4/1912 | Whitney | 204—180P |
| 2,631,100 | 3/1953 | Aten et al. | 99—57 |
| 2,758,965 | 8/1956 | Block et al. | 204—180P |
| 2,848,403 | 8/1958 | Rosenberg | 204—180P |
| 2,872,407 | 2/1959 | Kollsman | 204—301 |
| 3,166,486 | 1/1965 | Hull | 204—180P |
| 3,325,389 | 6/1967 | Parsi et al. | 204—180P |
| 3,369,906 | 2/1968 | Chen | 99—77 |
| 3,440,159 | 4/1969 | McRae et al. | 204—180P |
| 3,484,356 | 12/1969 | Goutard | 204—180P |

JOHN H. MACK, Primary Examiner

A. C. PRESCOTT, Assistant Examiner

U.S. Cl. X.R.

99—57